(12) United States Patent
Kawasaki et al.

(10) Patent No.: US 7,702,546 B2
(45) Date of Patent: Apr. 20, 2010

(54) ARTICLE STORAGE APPARATUS, ARTICLE STORING METHOD FOR THE APPARATUS, AND CONTROL PROGRAM FOR IMPLEMENTING THE METHOD

(75) Inventors: Katsuhiko Kawasaki, Kawasaki (JP); Yasuhiro Komori, Kawasaki (JP); Tsuyoshi Yagisawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1088 days.

(21) Appl. No.: 11/039,025

(22) Filed: Jan. 19, 2005

(65) Prior Publication Data

US 2005/0158151 A1    Jul. 21, 2005

(30) Foreign Application Priority Data

Jan. 20, 2004 (JP) .............................. 2004-012233

(51) Int. Cl.
*G06Q 10/00* (2006.01)
*G06Q 30/00* (2006.01)
*G06F 15/02* (2006.01)
*G06F 17/30* (2006.01)

(52) U.S. Cl. .............................. 705/28; 705/1.1; 705/10
(58) Field of Classification Search .................. 705/28; 235/385; 340/572.1; 365/45
See application file for complete search history.

(56) References Cited

U.S. PATENT DOCUMENTS

| 4,812,629 | A | * | 3/1989 | O'Neil et al. ............... 235/383 |
| 4,896,024 | A | * | 1/1990 | Morello et al. .............. 235/381 |
| 6,169,483 | B1 | * | 1/2001 | Ghaffari et al. .......... 340/572.3 |
| 6,523,752 | B2 | | 2/2003 | Nishitani et al. |
| 6,693,539 | B2 | * | 2/2004 | Bowers et al. ........... 340/572.1 |
| 6,812,838 | B1 | * | 11/2004 | Maloney ................... 340/568.1 |
| 6,844,821 | B2 | * | 1/2005 | Swartzel et al. .......... 340/691.6 |
| 6,901,304 | B2 | * | 5/2005 | Swan et al. ................. 700/115 |
| 6,999,960 | B2 | * | 2/2006 | Daily et al. .................... 707/5 |
| 7,289,969 | B1 | * | 10/2007 | Ballenger et al. ............. 705/28 |
| 7,336,174 | B1 | * | 2/2008 | Maloney ................... 340/572.1 |
| 7,356,495 | B2 | * | 4/2008 | Beigl et al. .................... 705/28 |
| 2002/0143668 | A1 | * | 10/2002 | Goodwin, III ............... 705/28 |
| 2003/0036985 | A1 | * | 2/2003 | Soderholm ................... 705/28 |
| 2004/0188524 | A1 | * | 9/2004 | Lunak et al. ................. 235/385 |
| 2007/0023513 | A1 | * | 2/2007 | Andreasson et al. ........ 235/385 |

FOREIGN PATENT DOCUMENTS

| JP | 62-205903 | | 9/1987 |
| JP | 2001-233410 | A | 8/2001 |
| JP | 2003-118816 | A | 4/2003 |
| JP | 2003-146414 | | 5/2003 |

* cited by examiner

*Primary Examiner*—F. Ryan Zeender
*Assistant Examiner*—Asfand M Sheikh
(74) *Attorney, Agent, or Firm*—Rossi, Kimms & McDowell LLP

(57) ABSTRACT

An article storage apparatus which enables categories to be subsequently assigned to storage sections or categories given to storage sections to be changed according to the progress of the user's storing operation or the user's desire. A plurality of storage shelves are provided to store articles. A RFID reader reads out a category assigned to an article to be stored in each of the storage shelves. A controller sets a category to be assigned to each storage shelf according to the category assigned to the article stored in the storage shelf.

4 Claims, 14 Drawing Sheets

FIG. 5
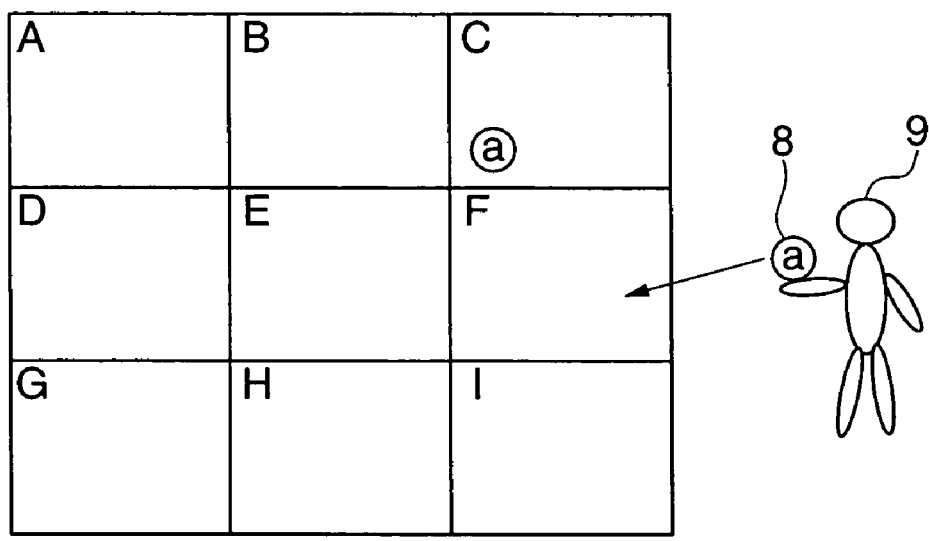
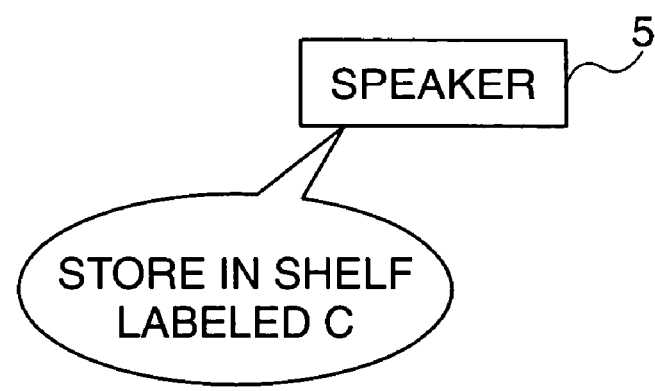

FIG. 6
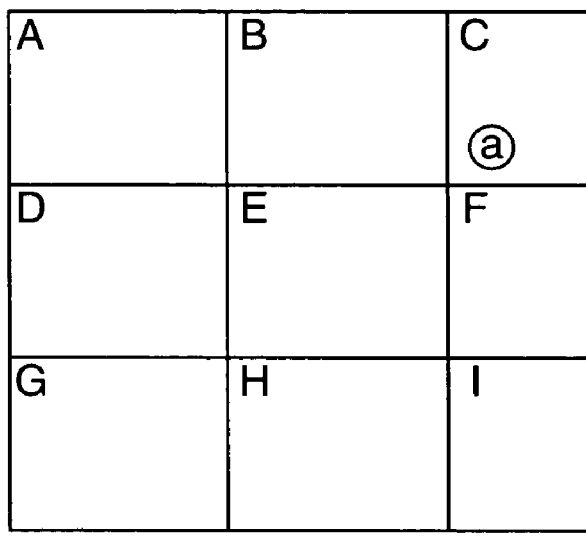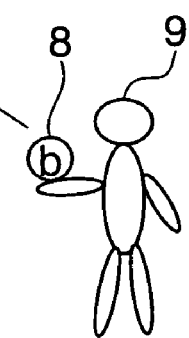

FIG. 8
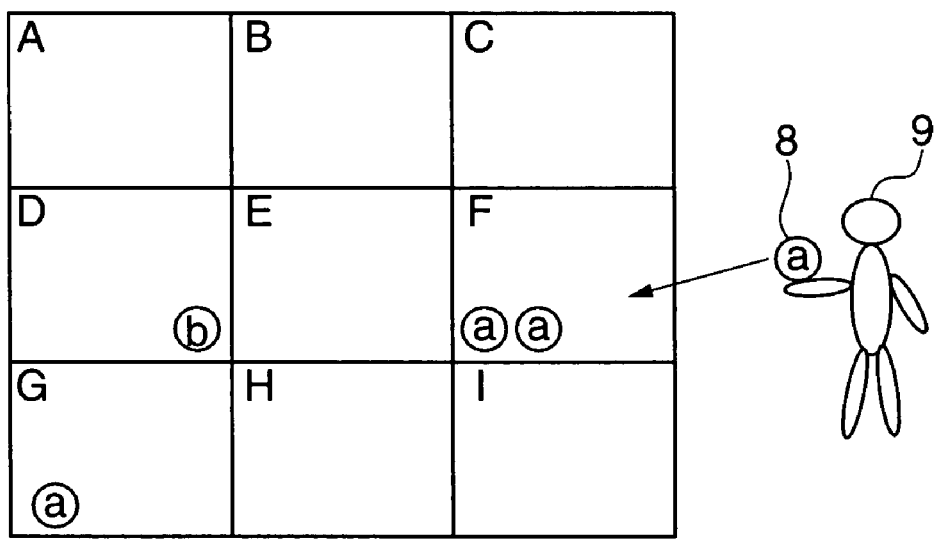

FIG. 9
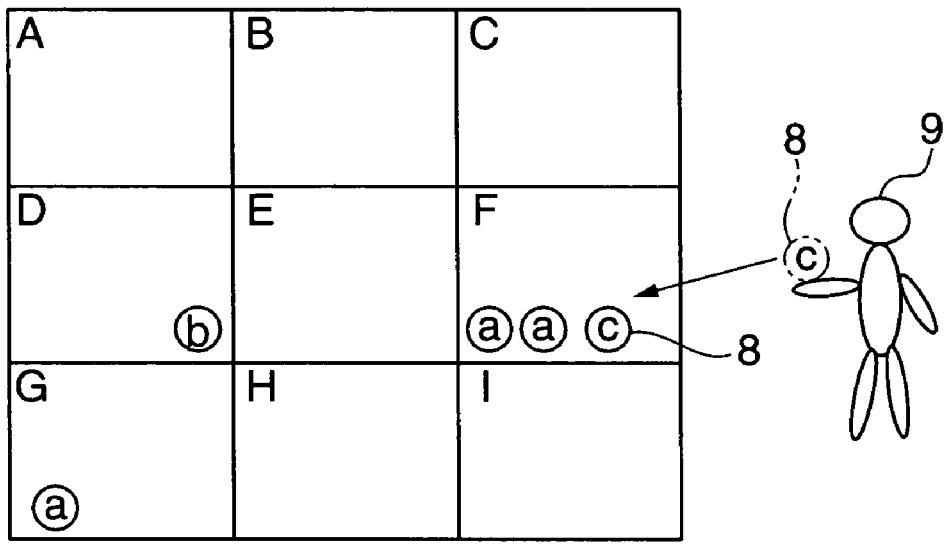
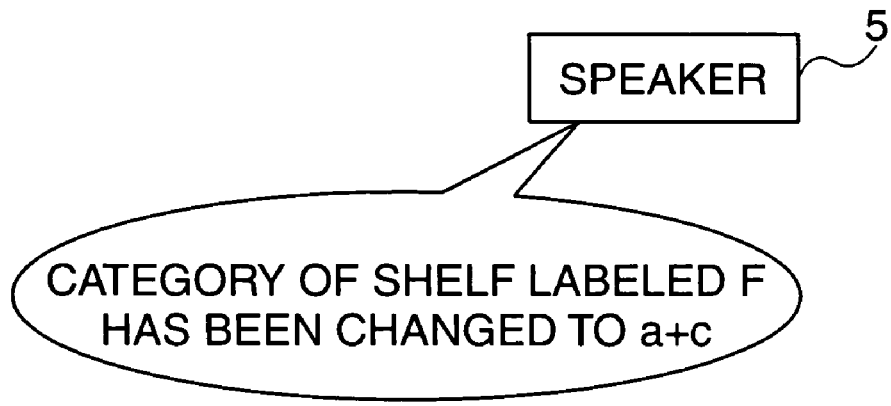

FIG. 10
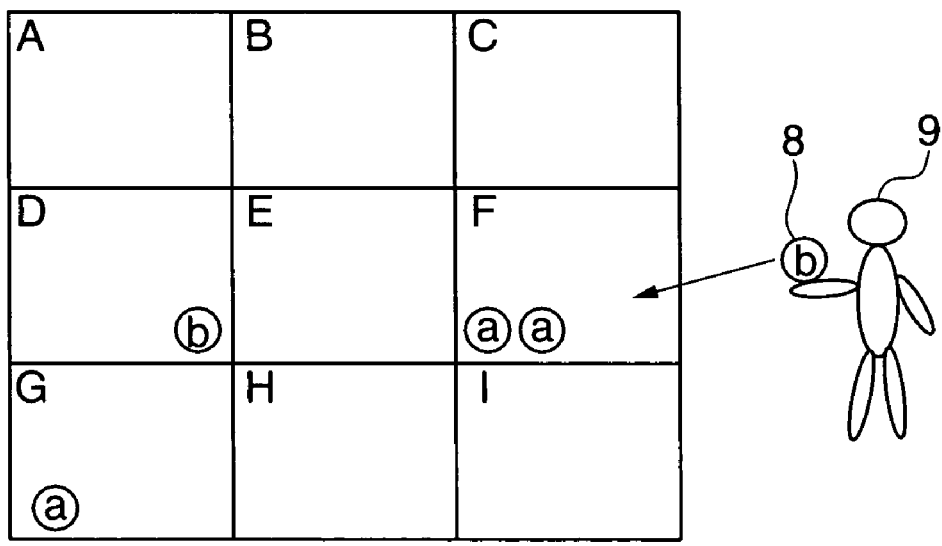
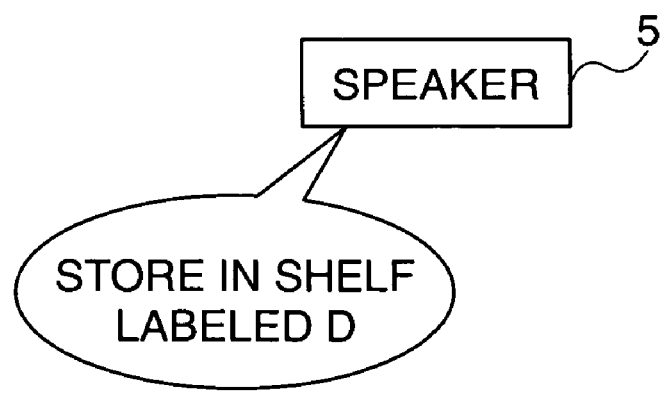

FIG. 11
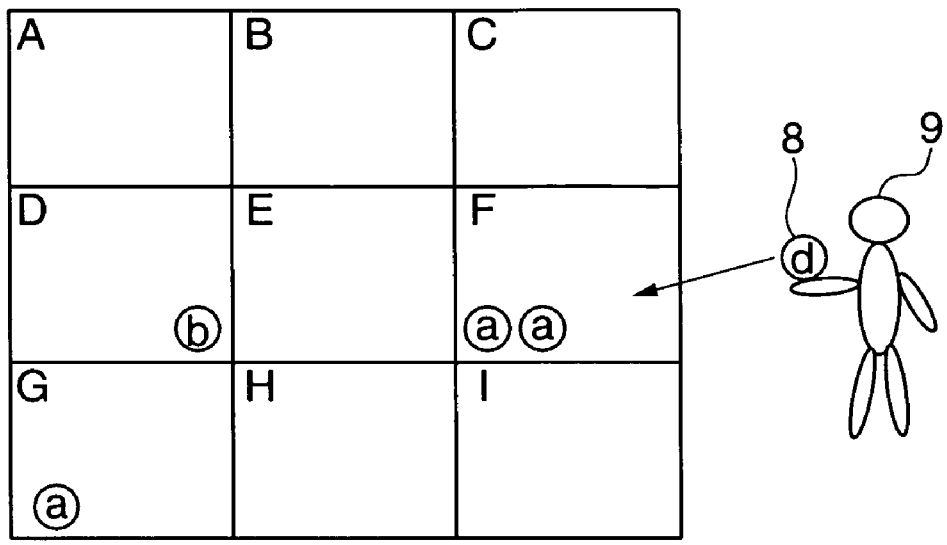
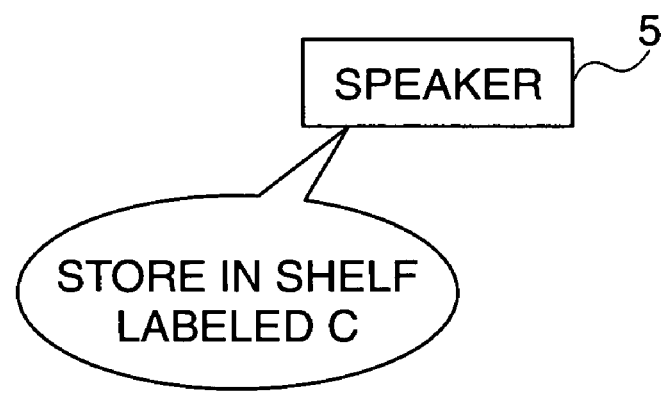

FIG. 12
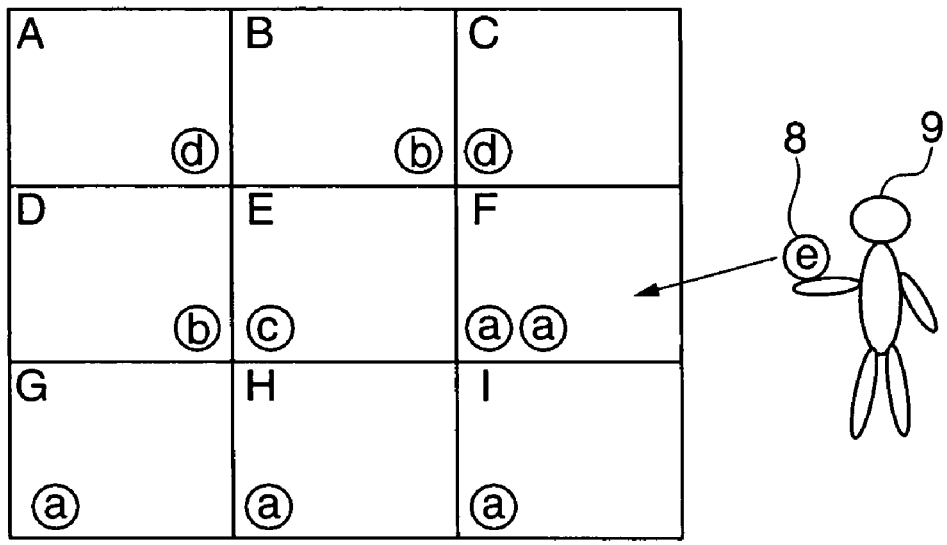
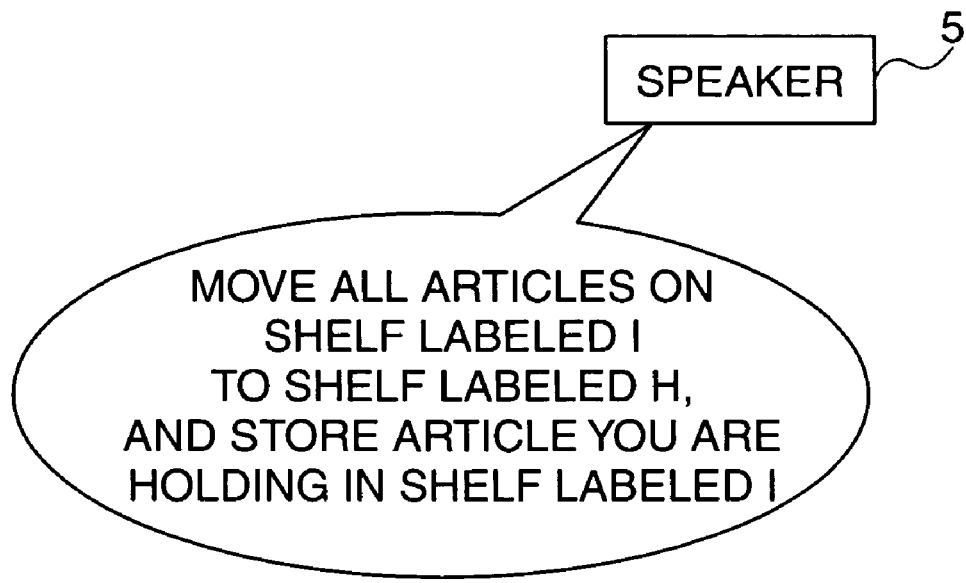

| [e] | [d] | [c] | [b] | [a] | |
|---|---|---|---|---|---|
| 3 | 4 | 3 | 4 | 0 | [a] |
| 5 | 2 | 5 | 0 | | [b] |
| 2 | 5 | 0 | | | [c] |
| 5 | 0 | | | | [d] |
| 0 | | | | | [e] |

ARTICLE STORAGE APPARATUS, ARTICLE STORING METHOD FOR THE APPARATUS, AND CONTROL PROGRAM FOR IMPLEMENTING THE METHOD

BACKGROUND OF THE INVENTION

1. Field of the Invention

The present invention relates to an article storage apparatus, which stores articles in storage sections such as storage shelves and boxes, an article storing method for the article storage apparatus, and a control program for implementing the article storing method.

2. Description of the Related Art

As a conventional article storing method, for example, there is a technology in which information such as a delivery request registration number, and the address and name of a recipient registered to a RFID (Radio Frequency-Identification) label attached to an article to be delivered is read out, it is determined which sorting carrier pallet the article is to be stored in based on the read information, the determination result is transmitted by a wireless communication means to a wireless receiver information display apparatus installed on the sorting carrier pallet which is determined to store the article, and the determined sorting carrier pallet is notified to an operator by means of audio or blinking of a lamp (refer to Japanese Laid-Open Patent Publication (Kokai) No. 2001-233410, and U.S. Pat. No. 6,523,752).

Moreover, there is a technology in which, according to EAN (European Article Number) code information, which includes the JAN (Japanese Article Number) code, of a returned article, one of sorting boxes of an article conveying apparatus, which is to store the article, is displayed on a display of the article conveying apparatus, and a lamp attached to the sorting box turns on. A host computer then instructs the article conveying apparatus to move to a predetermined article shelf. After the article conveying apparatus reaches the article shelf, a number assigned to the sorting box from which the article is to be taken out, and a diagram indicating the position of the article shelf, in which the taken out article is to be stored, are displayed on the display of the article conveying apparatus based on article storage instruction information (refer to Japanese Laid-Open Patent Publication (Kokai) No. 2003-118816).

However, according to the above conventional technologies, predetermined categories are given in advance to the storage sections such as the pallets and article shelves which are to store the articles or commodities. It is therefore impossible to improve the user friendliness and operating efficiency by newly adding categories to storage sections or changing categories given to storage sections according to the progress of the user's storing operation or the user's desire.

SUMMARY OF THE INVENTION

It is an object of the present invention to provide an article storage apparatus and an article storing method therefor which enable categories to be subsequently assigned to storage sections or categories assigned to storage sections to be changed according to the progress of the user's storing operation or the user's desire, thereby improving the user friendliness and operating efficiency, and a control program for implementing the article storing method.

To attain the above object, in a first aspect of the present invention, there is provided an article storage apparatus comprising a plurality of storage sections that store articles, a reading device that reads out first information on an article to be stored in each of the storage sections, and an assigned information setting device that sets second information to be assigned to each of the storage sections according to the first information on an article stored in the storage section.

With the above construction, it is possible to subsequently add categories to the storage sections or change categories given to the storage sections according to the progress of the user's storing operation or the user's desire, thereby improving the user friendliness and operating efficiency.

Preferably, the article storage apparatus comprises a memory device that stores the first information on an article stored in each of the storage sections, and the second information assigned to each of the storage sections, and a determining device that determines whether an article has been stored in at least one vacant storage section of the plurality of storage sections, based on results of the reading by the reading device and contents stored in the memory device, and the assigned information setting device is operable when the determining device determines that an article has been stored in the vacant storage section, to set the second information to be assigned to the vacant storage section based on the first information on the article read by the reading device.

Preferably, the article storage apparatus comprises a comparing device that compares the second information assigned to a storage section selected from the plurality of storage sections in order to store an article and the first information on the article read by the reading device, and the assigned information setting device is operable when the comparison by the comparing device shows a disagreement between the first information and the second information and the article has been stored in the selected storage section, to set the second information to be assigned to the selected storage section based on the second information already assigned to the selected storage section and the first information on the article read by the reading device.

Alternatively, the article storage apparatus comprises a comparing device that compares the second information assigned to a storage section selected from the plurality of storage sections in order to store an article and the first information on the article read by the reading device, and a navigating device that provides a navigation so as to store the article in one of the storage sections, based on results of the comparison by the comparing device.

More preferably, the article storage apparatus comprises a second determining device is operable when the comparison by the comparing device shows a disagreement between the first information and the second information, to determine whether there exists at least one of the plurality of storage sections which is other than the selected storage section and is assigned with the second information agreeing with the first information on the article, and the navigating device provides a navigation so as to store the article in the at least one storage section, based on results of the determination by the second determining device.

Still more preferably, the article storage apparatus comprises a third determining device operable when the determination by the second determining device shows that none of the plurality of storage sections other than the selected storage section is assigned with the second information agreeing with the first information on the article, to determine whether there exists at least one vacant storage section of the plurality of storage sections, and the navigating device is operable when the third determining device determines that there exists at least one vacant storage section, to provide a navigation so as to store the article in the vacant storage section.

More preferably, the article storage apparatus comprises a memory device that stores similarities between the second information assigned to the storage sections and the first information on the article, and the navigating device is operable when the third determining device determines that no vacant storage section exists, to refer to the memory device and provide a navigation so as to store an article in one of the plurality of storage sections to which is assigned the second information having highest similarity to the first information on the article.

Preferably, the article storage apparatus comprises a comparing device that compares the first information on an article read by the reading device and the second information assigned to the plurality of storage sections, and a navigating device is operable when there exist a plurality of the second information assigned to a plurality of ones of the storage sections, which agree with the first information on the article, to provide a navigation so as to store the article in a storage section having a largest vacant space or a storage section having a smallest vacant space, of the plurality of ones of the storage sections to which are assigned the plurality of the second information.

To attain the above object, in a second aspect of the present invention, there is provided an article storing method for an article storage apparatus including a plurality of storage sections that store articles, comprising a reading step of reading out first information on an article to be stored in each of the storage sections, and an assigned information setting step of setting second information to be assigned to each of the storage sections according to the first information on an article stored in the storage section.

To attain the above object, in a third aspect of the present invention, there is provided a control program for causing a computer to execute an article storing method for an article storage apparatus including a plurality of storage that store articles, comprising a reading module for reading out first information on an article to be stored in each of the storage sections, and an assigned information setting module for setting second information to be assigned to each of the storage sections according to the first information on an article stored in the storage section.

The above and other objects, features, and advantages of the invention will become more apparent from the following detailed description taken in conjunction with the accompanying drawings.

BRIEF DESCRIPTION OF THE DRAWINGS

FIG. 5 is a diagram useful in explaining a first specific example of the storing operation in FIG. 4;

FIG. 6 is a diagram useful in explaining a second specific example of the storing operation in FIG. 4;

FIG. 8 is a diagram useful in explaining a first specific example of the storing operation in FIG. 7;

FIG. 9 is a diagram useful in explaining a second specific example of the storing operation in FIG. 7;

FIG. 10 is a diagram useful in explaining a third specific example of the storing operation in FIG. 7;

FIG. 11 is a diagram useful in explaining a fourth specific example of the storing operation in FIG. 7;

FIG. 12 is a diagram useful in explaining a fifth specific example of the storing operation in FIG. 7;

DETAILED DESCRIPTION OF THE PREFERRED EMBODIMENTS

The present invention will now be described in detail below with reference to the drawings showing preferred embodiments thereof.

Figure 1:
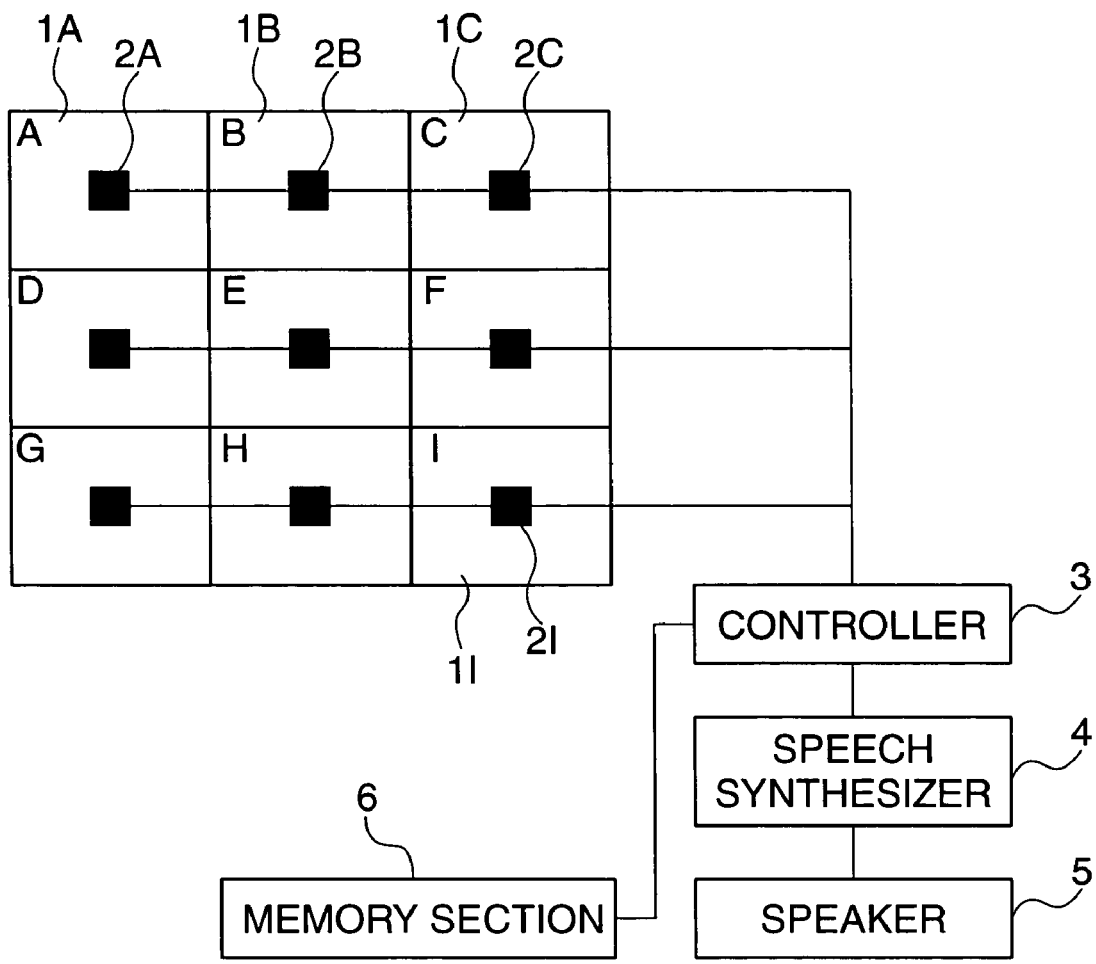
FIG. 1 is a block diagram schematically showing the configuration of an article storage apparatus according to a first embodiment of the present invention.
Figure 2:
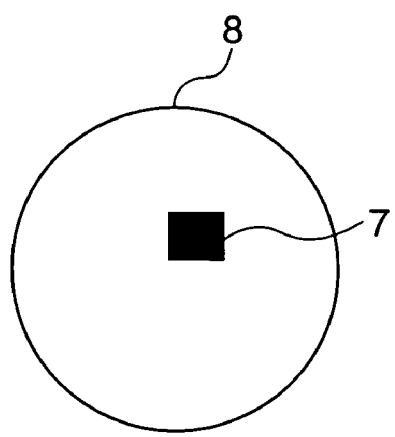
FIG. 2 is a diagram schematically showing the configuration of an article to be stored in a storage shelf appearing in FIG. 1.

FIG. 1 is a block diagram schematically showing the configuration of an article storage apparatus according to a first embodiment of the present invention. FIG. 2 is a diagram schematically showing the configuration of an article to be stored in a storage shelf appearing in FIG. 1.

As shown in FIG. 1, the article storage apparatus is comprised of nine storage shelves 1A, 1B, . . . , 1I which each have a space used to store an article 8 shown in FIG. 2, RFID readers 2A, 2B, . . . , 2I, a controller 3 which controls the operation of the entire apparatus, a speech synthesizer 4, a speaker 5, and a memory section 6.

Labels A, B, . . . , I are attached to the storage shelves 1A, 1B, . . . , 1I, respectively. Further, the RFID readers 2A, 2B, . . . , 2I are mounted in the storage shelves 1A, 1B, . . . , 1I, respectively. As shown in FIG. 2, the article 8 has mounted therein a RFID transmitter 7 which wirelessly transmits information (RFID) on the article 8.

The RFID readers 2A, 2B, . . . , 2I have a function of reading the RFID of the article 8 to be stored transmitted by the RFID transmitter 7, and are connected to the controller 3 through wire or wirelessly.

The speech synthesizer 4 and the memory section 6 are connected to the controller 3, and the speaker 5 is connected to the speech synthesizer 4. The memory section 6 stores categories assigned to the respective storage shelves 1A to 1I, and also stores information on the contents of the respective shelves 1A to 1I, namely information on the stored article 8, as needed. The speech synthesizer 4 generates a synthesized sound signal for use in navigating a user, for example, and outputs the sound signal to the speaker 5.

Figure 3:
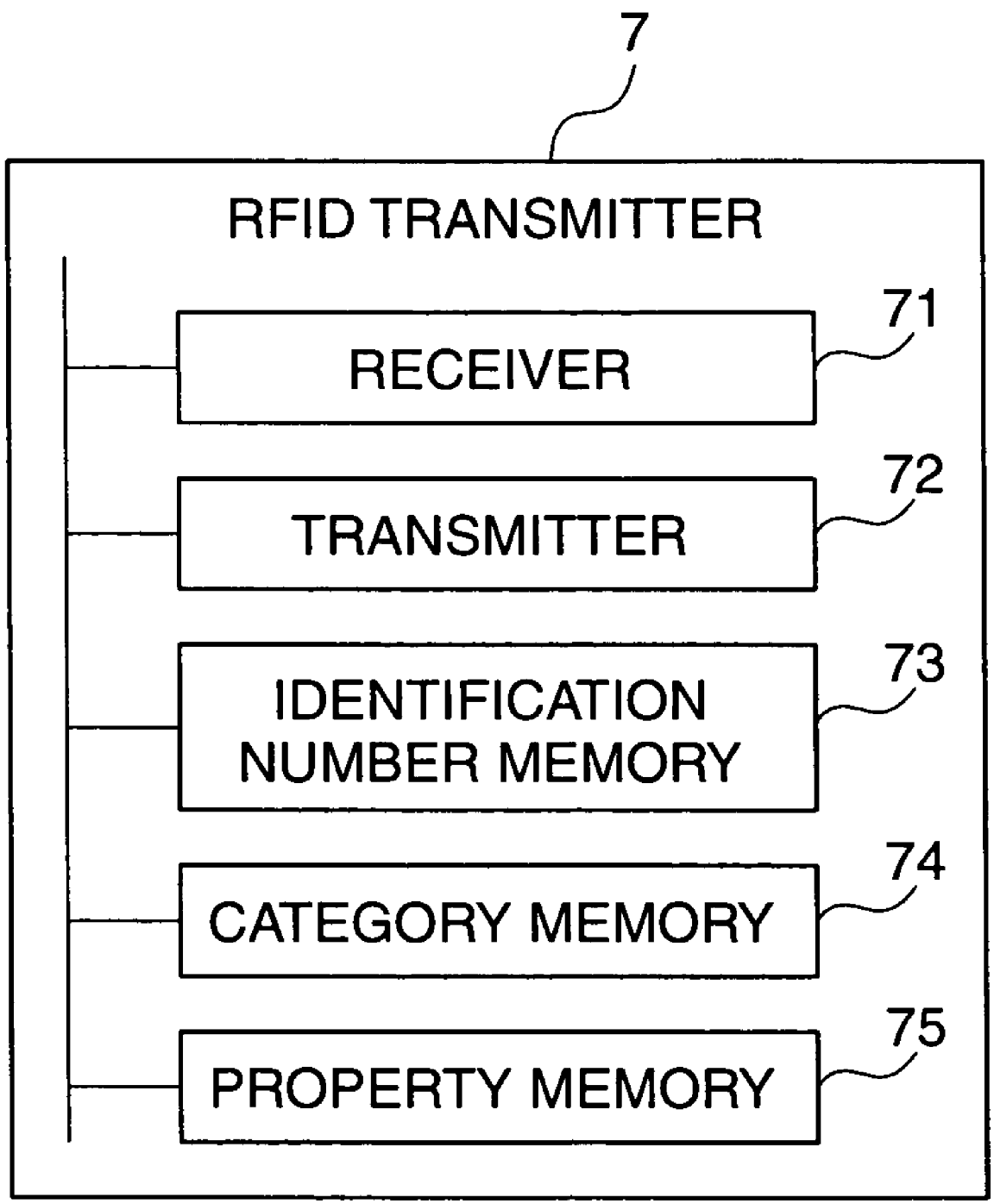
FIG. 3 is a block diagram showing the configuration of a RFID transmitter appearing in FIG. 2.

FIG. 3 is a block diagram showing the configuration of the RFID transmitter 7 appearing in FIG. 2.

The RFID transmitter 7 is comprised of a receiver 71 which receives a radio wave transmitted from the RFID readers 2A to 2I, an identification number memory 73 which stores an identification number assigned to the article 8, a category memory 74 which stores the category of the article 8, a property memory 75 which stores properties of the article 8 such as the weight, size, volume, and price, and a transmitter 72 which transmits a radio wave to the RFID readers 2A to 2I.

If the RFID transmitter 7 receives the radio wave from any of the RFID readers 2A to 2I, the RFID transmitter 7 transmits the identification number, category, and properties of the article 8 to the RFID reader 2A to 2I. The RFID readers 2A to 2I are each disposed at a center of the bottom of a corresponding one of the storage shelves 1A to 1I, transmits a directional radio wave to read out the information on the article 8, which is present within a certain area in the corresponding storage shelf 1A to 1I adjacent to an opening thereof. The controller 3 selects one of the RFID readers 2A to 2I that has received a radio wave of the highest intensity transmitted from the RFID transmitter 7 attached to the article 8, thereby determining that the user is storing the article 8 in the storage shelf corresponding the selected RFID reader.

Figure 4:
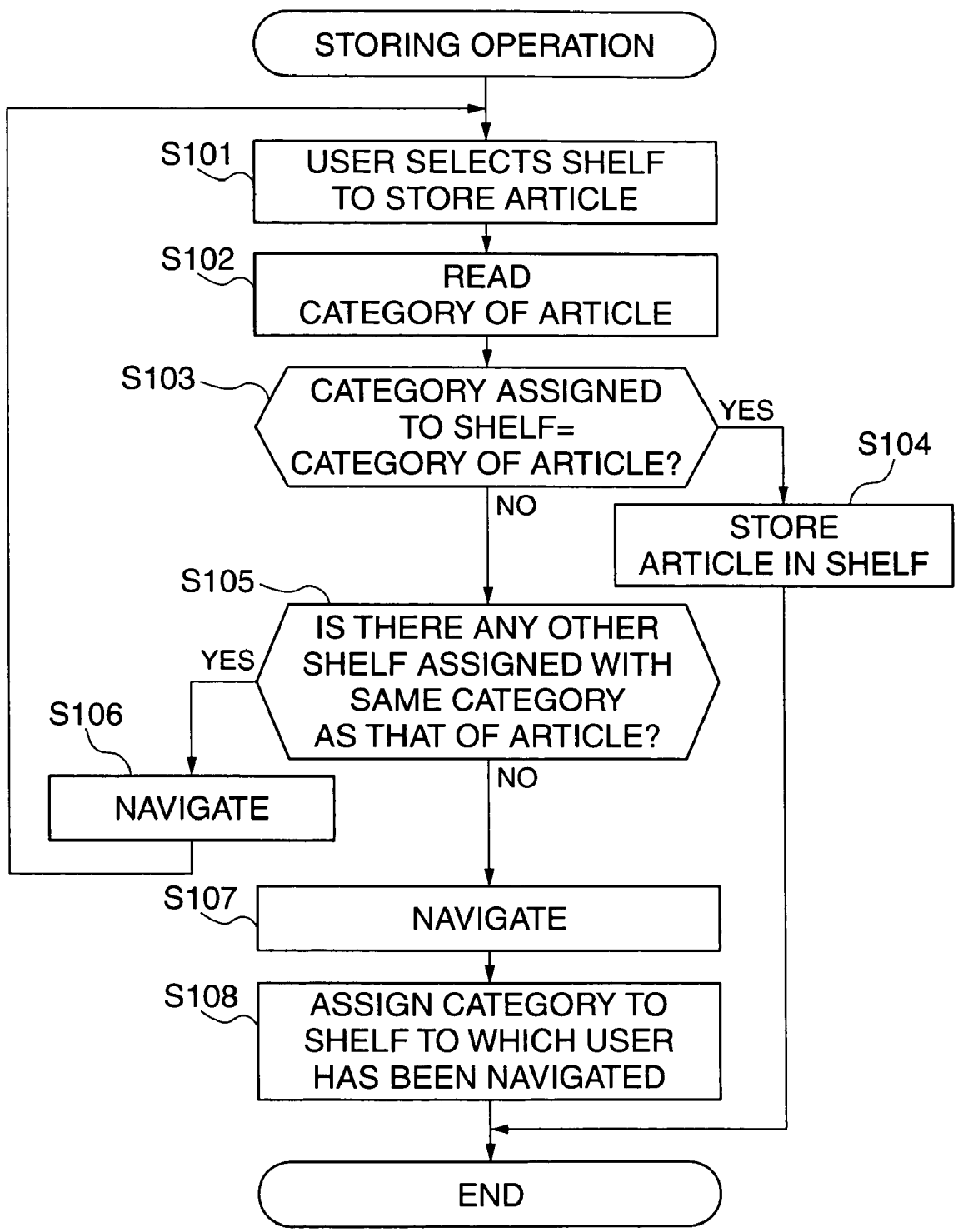
FIG. 4 is a flowchart showing a storing operation of the article storage apparatus in FIG. 1.

FIG. 4 is a flowchart showing a storing operation of the article storage apparatus in FIG. 1.

First, in a step S101, the user selects one of the pluralities of storage shelves 1A to 1I in order to store an article 8 bearing the RFID transmitter 7. If the user brings the article 8 close to the opening of the selected storage shelf, the RFID reader installed on the storage shelf receives the data transmitted from the RFID transmitter 7 attached to the article 8, thereby reading out the category of the article 8 (step S102).

Then, in the next step S103, the controller 3 compares the category assigned to the storage shelf and the category assigned to the article 8. If it is determined that the category assigned to the storage shelf and the category assigned to the article 8 are the same, no warning is given to the user, and the user thus stores the article 8 in the selected storage shelf (step S104).

On the other hand, if it is determined in the step S103 that the category assigned to the storage shelf and the category assigned to the article 8 are different from each other, the process proceeds to a step S105, where the controller 3 determines whether there is any other storage shelf assigned with the same category as that of the article 8. If there is any other shelf assigned with the same category as that of the article 8, the controller 3 navigates the user to the other storage shelf, if this shelf is to store the article 8, in a step S106.

If it is determined in the step S105 that there is no other storage shelf assigned with the same category as that of the article 8, the process proceeds to a step S107, where the controller 3 navigates the user to a predetermined storage shelf of the other storage shelves, if this shelf is to store the article 8 (introduces a vacant storage shelf, for example). After the article 8 is stored in the vacant storage shelf to which the user has been navigated, the same category as that of the article 8 is assigned to the storage shelf in a step S108.

A description will now be given of specific examples of the operations of the article storage apparatus in FIG. 1 and the user, following the flowchart in FIG. 4 with reference to FIGS. 5 and 6.

In a first specific example shown in FIG. 5, an article 8 with a category a is stored in the storage shelf 1C, and the other storage shelves are vacant. This state in which the category a is assigned to the storage shelf 1C will be referred to as C(a). None of the other storage shelves are assigned with categories, and these states will be referred to as A(NULL), B(NULL), D(NULL), . . . , I(NULL).

It is now assumed that a user 9 brings the article 8 with the category a close to the opening of the storage shelf 1F in order to store the article 8 in the storage shelf 1F (step S101). Then, the category of the article 8 is read out (step S102), and it is determined that the category a of the article 8 is different from the state NULL of the storage shelf 1F (a≠NULL) (step S103).

The controller 3 then searches to determine whether there is any other shelf assigned with the same category as the category a of the article 8 (step S105). Since the storage shelf 1C is assigned with the category a, the controller 3 navigates the user 9 to the storage shelf 1C if this shelf is to store the article 8 (step S106). On this occasion, the speech synthesizer 4 generates a message "Store in a shelf labeled C", and the speaker 5 sounds the message to the user 9.

In a second specific example shown in FIG. 6, the article 8 with the category a is stored in the storage shelf 1C, and the other storage shelves are vacant. In this example, the user 9 is storing an article 8 with a category b to the storage shelf 1C.

When the article 8 is brought close to the opening of the storage shelf 1C (step S101), the category b of the article 8 is read out (step S102). It is then determined that the category b of the article 8 is different from the category a assigned to the storage shelf 1C (b≠a) (step S103), and a search is carried out for any other shelf assigned with the category b, which is the same as the category b of the article 8 (step S105).

In this example, it is assumed that there is no storage shelf assigned with the category b, the controller 3 navigates the user 9 to the storage shelf 1F as a storage shelf to store the article 8, in the step S107. On this occasion, the speech synthesizer 4 generates a message "Store in another shelf such as a shelf labeled F", and the speaker 5 sounds the message to the user 9. When the user 9 stores the article 8 in the storage shelf 1F, the category b, which is the same as the category b of the article 8, is assigned to the storage shelf 1F (step S108). Namely, the storage shelf 1F shifts from the state F(NULL) to a state F(b).

In this way, according to the present embodiment, a category is subsequently assigned to a storage shelf according to the progress of the user's storing operation, thereby improving the user friendliness and operating efficiency.

Figure 7:
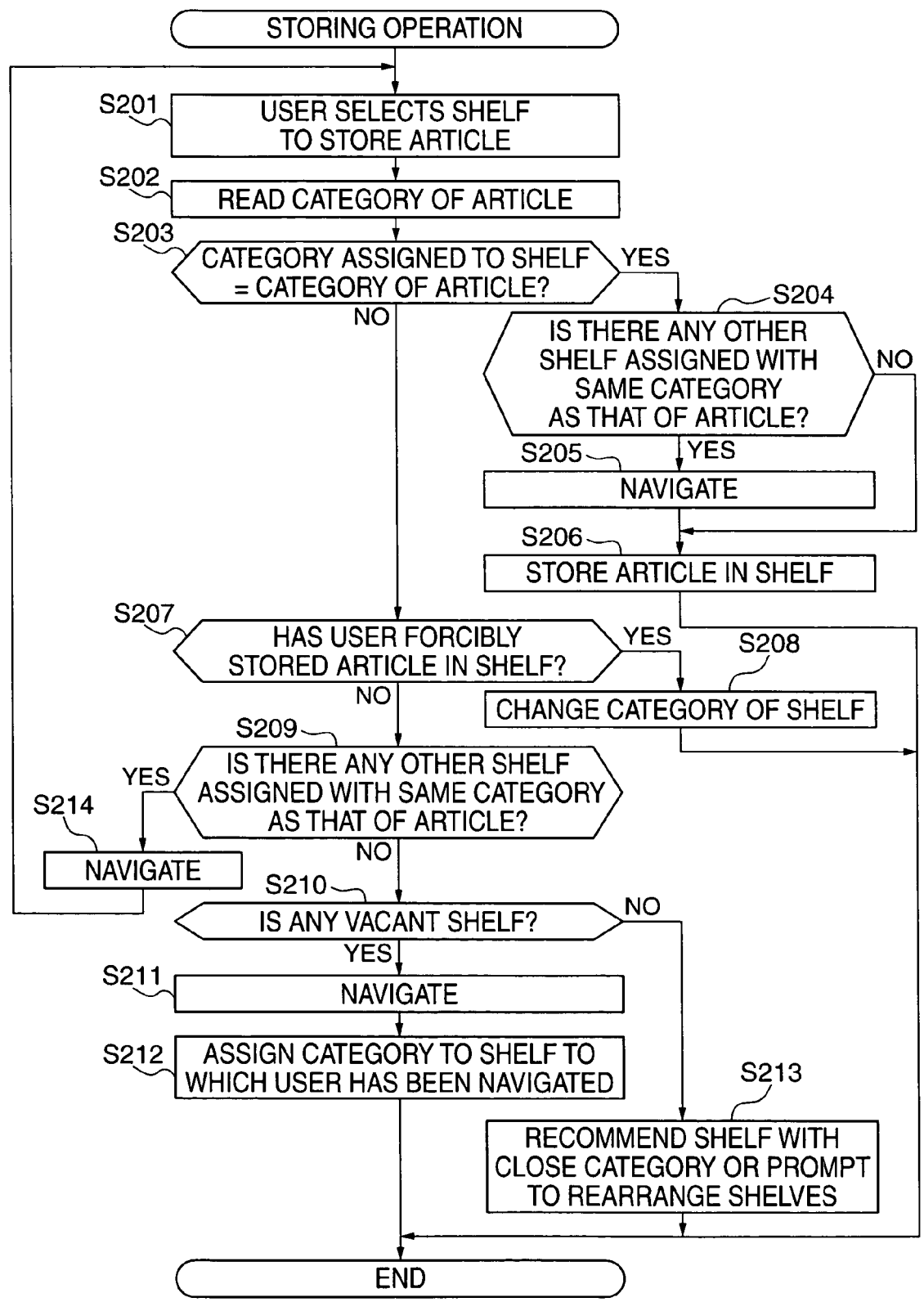
FIG. 7 is a flowchart showing a storing operation of an article storage apparatus according to a second embodiment of the present invention.

FIG. 7 is a flowchart showing a storing operation of an article storage apparatus according to a second embodiment of the present invention. It should be noted that the article storage apparatus according to the present embodiment is substantially identical in construction as the article storage apparatus according to the first embodiment described above.

First, in a step S201, the user selects one of the pluralities of storage shelves 1A to 1I in order to store an article 8 bearing the RFID transmitter 7. Next, in the next step S202, the user brings the article 8 close to the opening of the selected storage shelf, and then the RFID reader installed on the storage shelf receives the data transmitted from the RFID transmitter 7 attached to the article 8, thereby reading out the category assigned to the article 8. The controller 3 determines whether the category assigned to the selected storage shelf is the same as the category of the article 8 (step S203). If the answer to the step S203 is "YES", the controller 3 determines whether there is any other shelf assigned with the same category as that of the article 8 in a step S204. If the answer to the step S204 is "YES", the controller 3 navigates the user to the other storage shelf, if this shelf is to store the article 8, in a step S205, and the article 8 is stored in the storage shelf, to which the user has been navigated, in a step S206. Alternatively, if the answer to the step S204 is "NO", the process skips the step S205, and the article 8 is stored in the selected storage shelf in the step S206.

On the other hand, if the answer to the step S203 is "NO", it is determined in a step S207 whether the user has forcibly stored the article 8 in the selected storage shelf, which the user selected as stated above. If the answer to the step S207 is "YES", the category assigned to the storage shelf is changed in a step S208. On the other hand, if the answer to the step S207 is "NO", it is determined in a step S209 whether there is any other shelf assigned with the same category as that of the article 8. If the answer to the step S209 is "YES", the controller 3 navigates the user to the other storage shelf, if this shelf is to store the article 8, in a step S214.

On the other hand, if the answer to the step S209 is "NO", it is determined in a step S210 whether there are vacant storage shelves. If the answer to the step S210 is "YES", the controller 3 navigates the user to one of the vacant storage shelves, which is to store the article 8, in a step S211. If the article 8 is stored in the vacant storage shelf to which the user has been navigated, the same category as that of the article 8 is assigned to the storage shelf in a step S212. On the other hand, if the answer to the step S210 is "NO", the controller 3 recommends a storage shelf assigned with a category close to that of the article 8, or prompts the user to rearrange the storage shelves in a step S213.

A description will now be given of specific examples of the operations of the article storage apparatus according to the second embodiment and the user, following the flowchart in FIG. 7 with reference to FIGS. 8 to 14.

In a first specific example shown in FIG. 8, the article storage apparatus is in a state of A(NULL), B(NULL), C(NULL), D(b), E(NULL), F(a), G(a), H(NULL), and I(NULL).

It is assumed that the user 9 is storing the article 8 with the category a in the storage shelf 1F (step S201). The category a of the article 8 is read out in the step S202. It is determined that the category a assigned to the storage shelf 1F is the same with the category a of the article 8 in the step S203. It is determined in the step S204 that there is any other shelf assigned with the category a, which is the same as the category a of the article 8. Then, the controller 3 reads out the contents of the storage shelves from the memory section 6 in the step S205, and selects a storage shelf which has the largest vacant space from the storage shelves assigned with the category a. Here, it is assumed that the storage shelf with the largest vacant space is the storage shelf 1G, which is then selected, and the speech synthesizer 4 generates a message "Store in the shelf labeled G".

Although the storage shelf with the largest vacant space in the first specific example in FIG. 8, the controller 3 may recommend a storage shelf, which is one of the storage shelves assigned with the category a, can newly store the article 8 in the category a, and has the smallest vacant space, to the user 9.

In a second specific example shown in FIG. 9, the article storage apparatus is in a state of A(NULL), B(NULL), C(NULL), D(b), E(NULL), F(a), G(a), H(NULL), and I(NULL). It is assumed that the user 9 has just forcibly stored an article 8 with a category c in the storage shelf 1F assigned with the category a. In this case, the answer to the step S203 is "NO", and the answer to the step S207 is "YES", so that the process proceeds to the step S208. In the step S208, the controller 3 changes the state of the storage shelf 1F from F(a) to F(a+c), and the speech synthesizer 4 synthesizes a message "Category of the shelf labeled F has been changed to a+c".

In a third specific example shown in FIG. 10, the article storage apparatus is in a state of A(NULL), B(NULL), C(NULL), D(b), E(NULL), F(a), G(a), H(NULL), and I(NULL). It is assumed that the user 9 is storing an article 8 with the category b in the storage shelf 1F assigned with the category a. In this case, the answer to the step S203 is "NO", the answer to the step S207 is "NO", and the answer to the step S210 is "YES", so that the process proceeds to the step S214. In the step S214, the speech synthesizer 4 synthesizes a message "Store in the shelf labeled D".

In a fourth specific example shown in FIG. 11, the article storage apparatus is in a state of A(NULL), B(NULL), C(NULL), D(b), E(NULL), F(a), G(a), H(NULL), and I(NULL). It is assumed that the user 9 is storing an article 8 with a category d in the storage shelf 1F assigned with the category a. In this case, the answer to the step S203 is "NO", the answer to the step S207 is "NO", the answer to the step S209 is "NO", and the answer to the step S210 is "YES", so that the process proceeds to the step S211. In the step S211, one of the vacant storage shelves which is closest to the storage shelf 1F (e.g. the storage shelf 1C) is selected. Then, the speech synthesizer 4 synthesizes a message "Store in the shelf labeled C". If the user 9 stores the article 8 in the storage shelf 1C to which the user 9 has been navigated in the step S212, the state of the article storage apparatus shifts into a state of A(NULL), B(NULL), C(d), D(b), E(NULL), F(a), G(a), H(NULL), and I(NULL).

In a fifth specific example shown in FIG. 12, the article storage apparatus is in a state where the user 9 is storing an article 8 with a category e in the storage shelf 1F assigned with the category a when none of the storage shelves are vacant. In this case, the answer to the step S203 is "NO", the answer to the step S207 is "NO", the answer to the step S209 is "NO", and the answer to the step S210 is "NO", so that the process proceeds to the step S213. In the step S213, the controller 3 prompts the user 9 to rearrange the storage shelves. Then, the speech synthesizer 4 synthesizes a message "Move all articles in the shelf labeled I to the shelf labeled H, and store an article you hold in the shelf labeled I", for example.

Figures 13, 14:
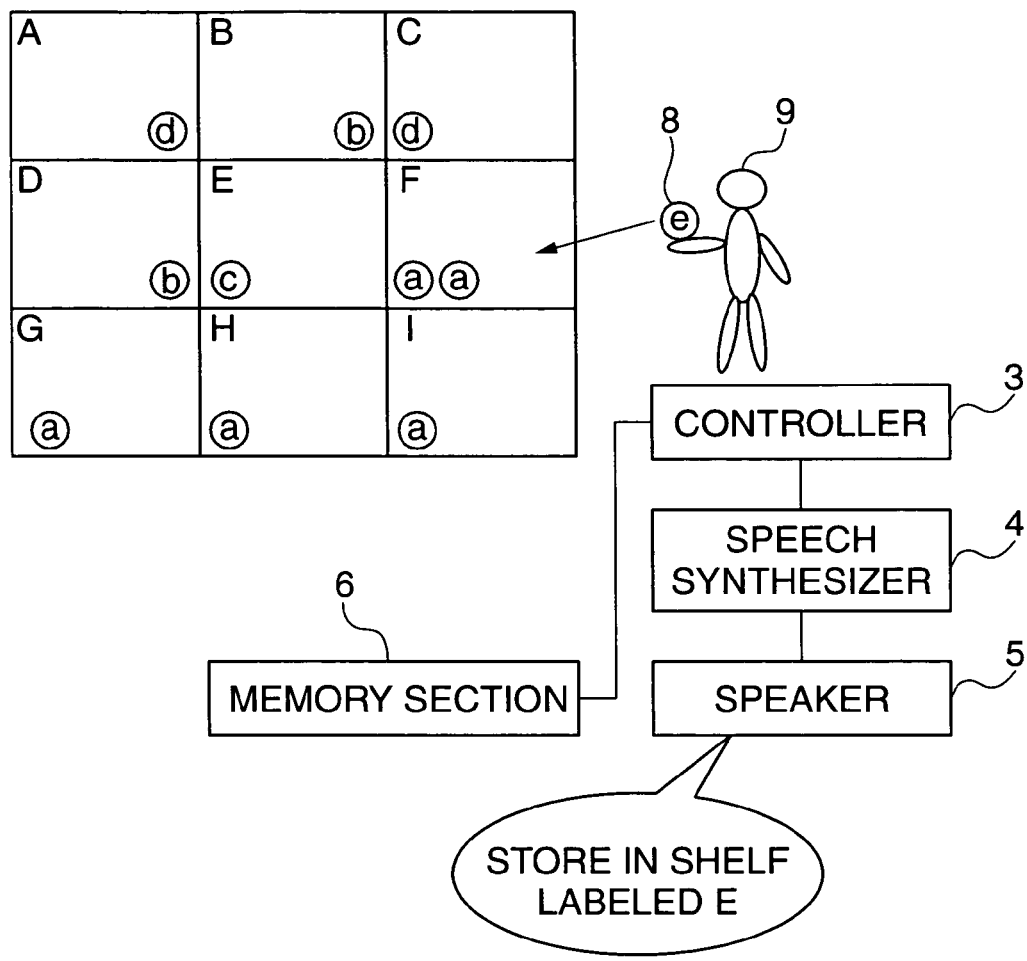
FIG. 13 is a diagram useful in explaining a sixth specific example of the storing operation in FIG. 7.
FIG. 14 is a diagram showing a table indicative of distances (similarities) between categories.

In a sixth specific example shown in FIG. 13, the article storage apparatus is in a state where the user 9 is storing an article 8 with the category e in the storage shelf 1F assigned with the category a when none of the storage shelves are vacant. In this case, the answer to the step S203 is "NO", the answer to the step S207 is "NO", the answer to the step S209 is "NO", and the answer to the step S210 is "NO", so that the process proceeds to the step S213. In the step S213, the controller 3 recommends a storage shelf assigned with a category having high similarity to the category e of the article 8 which is to be stored, to the user 9. Specifically, the controller 3 refers to a table shown in FIG. 14, which indicates distances (similarities) between the categories. In the table of FIG. 14, the smaller the value of the similarity, the shorter the distance between the categories, and a value "0" of the similarity indicates that the two categories are the same. For example, the category c which has the highest similarity to the category e is selected, and one of the storage shelves assigned with the category c (A message "Store in the shelf labeled E" is synthesized).

In this way, according to the present embodiment, a category is subsequently assigned to a storage shelf according to the progress of the user's storing operation or the user's desire, thereby improving the user friendliness and working efficiency.

While in the above embodiments the storing operations of storing an article in a storage shelf were described, a description will now be given of a taking-out operation of taking out an article from a storage shelf of the article storage apparatus.

Figure 15:
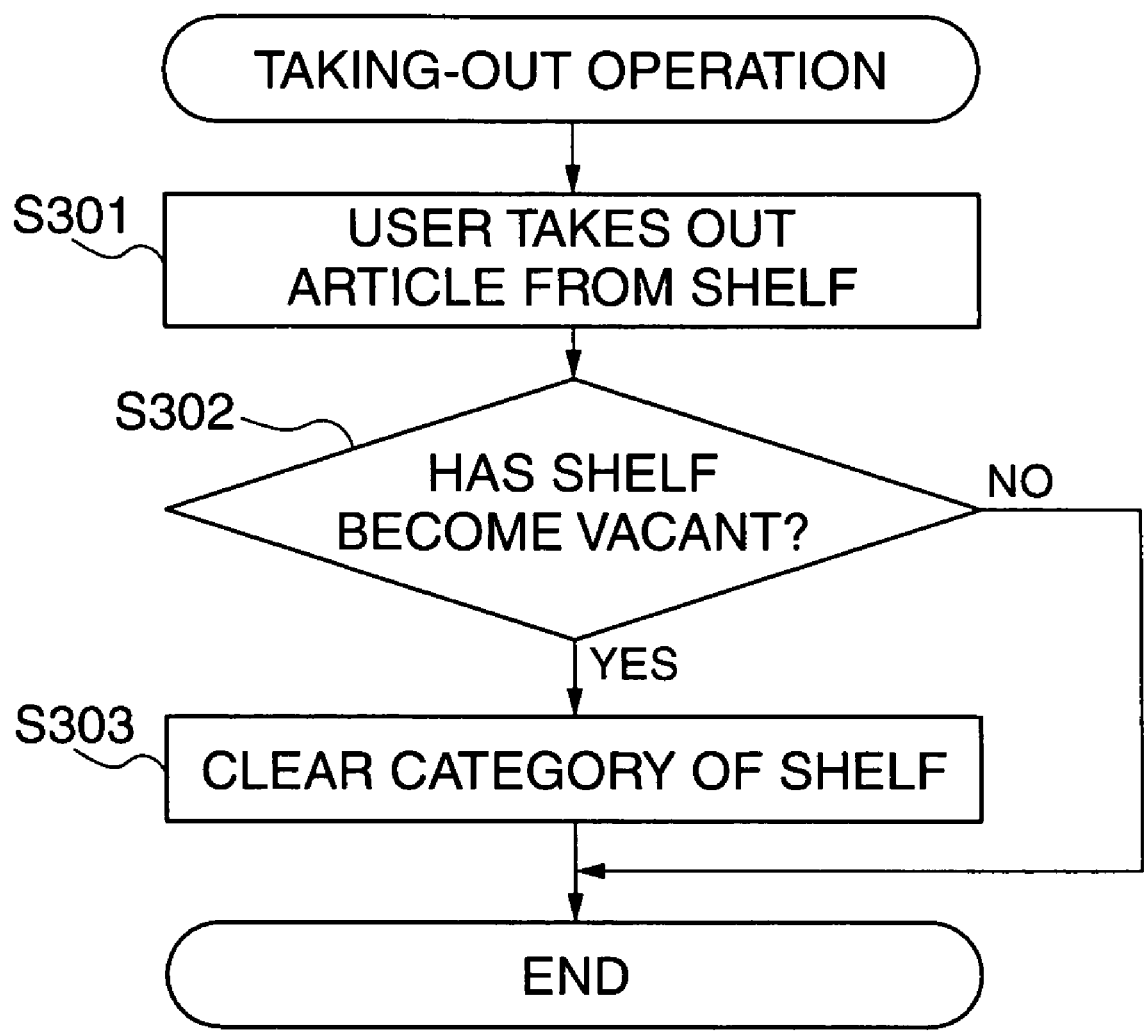
FIG. 15 is a flowchart showing a taking-out operation of the article storage apparatus.

FIG. 15 is a flowchart showing the taking-out operation of the article storage apparatus.

The user first takes out an article from a storage shelf in a step S301. The controller 3 then determines whether the storage shelf from which the article has been taken out has become vacant or not in a step S302. If the storage shelf has become vacant, the category assigned to the storage shelf is cleared (the storage shelf is set to the state NULL)

Figure 16:
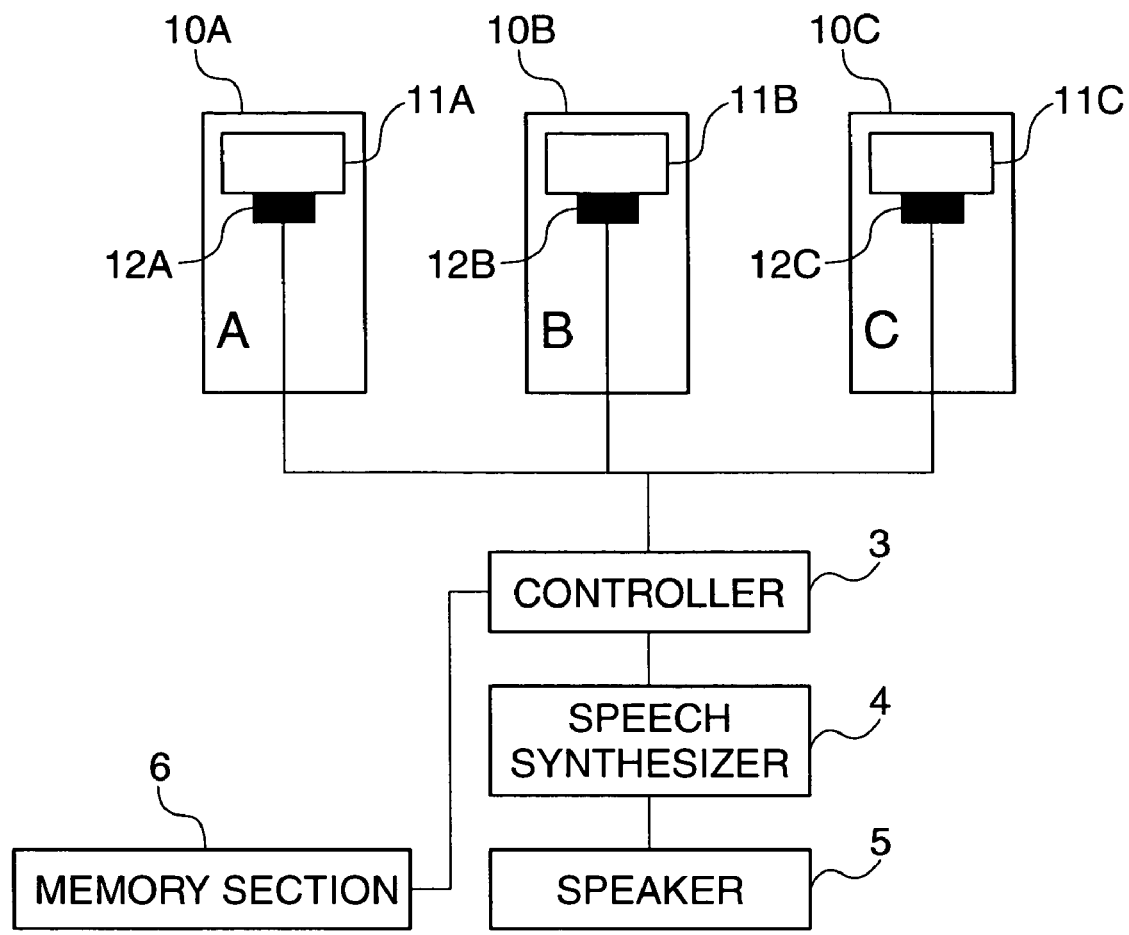
FIG. 16 is a block diagram schematically showing the configuration of an article storage apparatus according to a third embodiment of the present invention.

FIG. 16 is a block diagram schematically showing the configuration of an article storage apparatus according to a third embodiment of the present invention. In FIG. 16, elements and parts which correspond to those of the article storage apparatus in FIG. 1 are designated by identical reference numerals, and duplicate description thereof is omitted.

The article storage apparatus in FIG. 16 is comprised of storage boxes 10A, 10B, and 10C provided respectively with slots 11A, 11B, and 11C, barcode readers 12A, 12B, and 12C which are disposed in the vicinity of the respective corresponding slots 11A, 11B, and 11C, the controller 3, the speech synthesizer 4, the speaker 5, and the memory section 6.

The storage boxes 10A, 10B, and 10C are attached respectively with labels A, B, and C. In the present embodiment, the memory section 6 stores information on articles corresponding to the respective barcodes, and what articles and how many articles are stored in the respective storage boxes 10A, 10B, and 10C.

Figure 17:
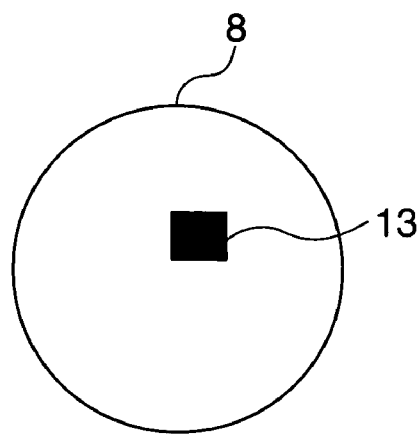
FIG. 17 is a diagram schematically showing the configuration of an article to be stored in a storage box appearing in FIG. 16.

FIG. 17 is a diagram schematically showing the configuration of an article 8 to be stored in a storage box 10 in FIG. 16. Barcodes 13 are attached to the respective articles 8.

When the article 8 is being input to any of the storage boxes 10A to 10C via a corresponding one of the slots 11A to 11C, a corresponding one of the barcode readers 12A to 12C reads out the barcode 13 attached to the input article 8. Information such as the category and properties of the article 8 is acquired by reference to the information stored in the memory section 6, based on the barcode 13, which has been read out.

As in the above respective embodiments, in the present embodiment as well, the category assigned to each of the storage boxes 10A to 10C is subsequently determined according to the category of the article 8 which has been input to the storage box.

Although in the above first and second embodiments, the RFID readers 2A to 2I are each disposed at the center of the bottom of a corresponding one of the storage shelves 1A to 1I and in the above third embodiment, the barcode readers 12A to 12C are disposed in the vicinity of the slots 11A to 11C of the respective corresponding storage boxes 10A to 12C, each storage shelf or each storage box may include a door, and the RFID reader or the barcode reader may be installed on the door.

Moreover, although the navigation for the user is carried out by means of the speech synthesizer 4 in the above embodiments, the navigation may be carried out by providing a predetermined display section in place of the speech synthesizer 4 and showing the contents of the navigation on the display section.

It is to be understood that the present invention is not limited to the apparatuses according to the above embodiments, and may either be applied to a single apparatus or to a system composed of a plurality of apparatuses.

It is to be understood that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2004-012233 filed Jan. 20, 2004, which is hereby incorporated by reference herein.

What is claimed is:

1. An article storage apparatus comprising:
a plurality of storage units adapted to store articles;
a reading unit adapted to read out information on an article to be stored in each of said plurality of storage units;
a memory unit adapted to store first category information indicative of categories assigned to the respective plurality of storage units and second category information indicative of categories of the articles from among information on the articles read out by said reading unit;
a first comparing unit adapted to compare the first category information indicative of a category assigned to a storage unit selected from said plurality of storage units with the second category information indicative of a category of an article to be stored in the selected storage unit;
a second comparing unit adapted to compare the second category information indicative of the category of the article to be stored in the selected storage unit with the first category information assigned to another storage unit selected from said plurality of storage units, in a case where the comparison result of said first comparing unit exhibits that the first category information indicative of the category assigned to the selected storage unit is identical to the second category information indicative of the category of the article to be stored in the selected storage unit;
a determining unit adapted to determine whether more than one storage unit among the plurality of storing units are associated with the first category information that is identical to the second category information indicative of the category of the article to be stored in the selected storage unit as a comparison result of said second comparing unit;
a selecting unit adapted to, in a case where more than one storage unit among the plurality of storing units are associated with the first category information that is identical to the second category information indicative of the category of the article to be stored in the selected storage unit as a comparison result of said second comparing unit, select at least one storage unit having a largest or smallest vacant space among the plurality of storage units associated with the first category information; and a navigating unit adapted to navigate the article to be stored to the selected at least one storage unit among the plurality of storage units associated with the first category information.

2. The article storage apparatus as claimed in claim 1, wherein said navigating unit is adapted to perform the navigation using audio.

3. An article storing method of an article storage apparatus including a plurality of storage units for storing articles, the method being executable by a computer, the method comprising:

a reading step of reading out information on an article to be stored in each of the plurality of storage units using a reading unit connected to the computer;

a first storing step of storing first category information indicative of categories assigned to the respective plurality of storage units in a memory unit of the computer;

a second storing step of storing second category information indicative of categories of the articles from among information on the articles read out in said reading step in the memory unit;

a first comparing step of comparing with the computer the first category information indicative of a category assigned to a storage unit selected from the plurality of storage units with the second category information indicative of a category of an article to be stored in the selected storage unit;

a second comparing step of comparing with the computer the second category information indicative of the category of the article to be stored in the selected storage unit with the first category information assigned to another storage unit selected from said plurality of storage units, in a case where the comparison result of said first comparing step exhibits that the first category information indicative of the category assigned to the selected storage unit is identical to the second category information indicative of the category of the article to be stored in the selected storage unit;

a determining step of determining with the computer whether more than one storage unit among the plurality of storing units are associated with the first category information that is identical to the second category information indicative of the category of the article to be stored in the selected storage unit as a comparison result of said second comparing step;

a selecting step of, in a case where more than one storage unit among the plurality of storing units are associated with the first category information that is identical to the second category information indicative of the category of the article to be stored in the selected storage unit as a comparison result of said second comparing unit, selecting with the computer at least one storage unit having a largest or smallest vacant space among the plurality of storage units associated with the first category information; and a navigating step of navigating with the computer the article to be stored to the selected at least one storage unit among the plurality of storage units associated with the first category information.

4. A computer-readable medium storing a computer program executable by a computer for controlling an article storage apparatus including a plurality of storage units for storing articles, the computer program comprising:

a reading module for reading out information on an article to be stored in each of the plurality of storage units;

a first storing module for storing first category information indicative of categories assigned to the respective plurality of storage units in a memory unit of the computer;

a second storing module for storing second category information indicative of categories of the articles from among information on the articles read out by said reading module in the memory unit;

a first comparing module for comparing the first category information indicative of a category assigned to a storage unit selected from the plurality of storage units with the second category information indicative of a category of an article to be stored in the selected storage unit;

a second comparing module for comparing the second category information indicative of the category of the article to be stored in the selected storage unit with the first category information assigned to another storage unit selected from said plurality of storage units, in a case where the comparison result of said first comparing module exhibits that the first category information indicative of the category assigned to the selected storage unit is identical to the second category information indicative of the category of the article to be stored in the selected storage unit;

a determining module for determining whether more than one storage unit among the plurality of storing units are associated with the first category information that is identical to the second category information indicative of the category of the article to be stored in the selected storage unit as a comparison result of said second comparing module;

a selecting module for, in a case where more than one storage unit among the plurality of storing units are associated with the first category information that is identical to the second category information indicative of the category of the article to be stored in the selected storage unit as a comparison result of said second comparing module, selecting at least one storage unit having a largest or smallest vacant space among the plurality of storage units associated with the first category information; and a navigating module for navigating the article to be stored to the selected at least one storage unit among the plurality of storage units associated with the first category information.

* * * * *